United States Patent [19]

Urban et al.

[11] Patent Number: 4,622,213

[45] Date of Patent: Nov. 11, 1986

[54] SULFUR DIOXIDE REMOVAL FROM GAS STREAMS

[75] Inventors: Peter Urban; Edward A. Ginger, both of Northbrook, Ill.

[73] Assignee: UOP Inc., Des Plaines, Ill.

[21] Appl. No.: 773,686

[22] Filed: Sep. 9, 1985

[51] Int. Cl.[4] ............................................. C01B 17/00
[52] U.S. Cl. .................................... 423/242; 423/244
[58] Field of Search ............... 423/244 A, 244 R, 243, 423/242 A, 242 R

[56] References Cited

U.S. PATENT DOCUMENTS

| | | | |
|---|---|---|---|
| 3,943,230 | 3/1976 | Yamamichi et al. | 423/242 |
| 4,093,026 | 1/1978 | Ridley | 423/244 |
| 4,140,181 | 2/1979 | Ridley et al. | 423/244 |

FOREIGN PATENT DOCUMENTS

| | | | |
|---|---|---|---|
| 57-207530 | 12/1982 | Japan. | |
| 58-8538 | 1/1983 | Japan | 423/242 |

*Primary Examiner*—Gregory A. Heller
*Attorney, Agent, or Firm*—Thomas K. McBride; John F. Spears, Jr.

[57] ABSTRACT

A process for absorbing sulfur dioxide from a gas stream comprising contacting said gas stream with a slurry of pretreated shale in an aqueous medium wherein the shale acts catalytically to convert the sulfite radical to the sulfate radical.

16 Claims, No Drawings

SULFUR DIOXIDE REMOVAL FROM GAS STREAMS

BACKGROUND OF THE INVENTION

The use of sulfur-containing fuels such as coal results in flue gases contaminated with gaseous sulfur dioxides environmentally undesirable in that this oxide is thought to be one of the major sources of acid rain and therefore the permissible levels of emission of sulfur dioxides is regulated in order to provide that these vented gas streams enter the atmosphere with the minimal impact of introduction of miniscule quantities of sulfur-containing pollutant gases.

In order to meet these regulatory criteria, producers of the contaminant sulfur dioxide derived numerous flue gas scrubbing methods for desulfurization utilizing stoichiometric amounts of dry alkaline reagents such as lime, limestone, sodium carbonate, sodium carbonate in tandem with lime, magnesium oxide, sodium sulfite, spent shale, and basic aluminum sulfate as well as aqueous solutions and slurries of these aforementioned reagents to absorb the sulfurous gases and convert them to sulfite radicals with a usual subsequent oxidation to the sulfate radical followed by disposal or regeneration of the absorbing medium.

A particular method for achieving this absorption and subsequent oxidation of sulfur dioxide in present use is known as the DOWA process. This DOWA process, as described in U.S. Pat. No. 3,943,230, utilizes a buffered acid medium flue gas desulfurization method which consists of scrubbing said flue gas with an aqueous solution of basic aluminum sulfate, thereby transforming sulfur dioxide to the sulfite radical, oxidizing this aqueous solution in an oxidizing unit to the sulfate radical, and then reacting a small portion of this alum solution with calcium carbonate to precipitate calcium sulfate and to regenerate the basic aluminum sulfate solution so as to afford a recirculation of the absorbing medium.

The basic aluminum sulfate solution is described as having a certain "percentage of basicity" calculated as the amount (equivalents) of aluminum in solution as aluminum hydroxide, divided by the total aluminum content of the solution, and multiplied by 100. For illustration, if a one molar solution of aluminum sulfate has one mole of calcium carbonate added to it to form one mole of calcium sulfate, the resulting solution is described as having a 33.3% basicity since two of the six equivalents of aluminum in solution have been converted to the basic form by losing the sulfate radical and gaining two hydroxide radicals, $$\frac{2 \text{ equivalents as Al}^{+++}(\text{OH}^-\text{form})}{6 \text{ equivalents Al}^{+++}(\text{total})} \times 100\% = 33.3\%$$

A second method of control described in Japanese Pat. Nos. JP5700207530 and JP58008538 teaches the use of a water slurry of spent shale at high pH to absorb the sulfur dioxide from flue gases with the stoichiometric amounts of shale in large quantities of water.

In order to minimize the quantities of shale necessary and to minimize the quantity of water to be pumped through the flue gas scrubber, a process had to be devised in which the shale acted catalytically instead of stoichiometrically and in which a solution of basic aluminum sulfate was to be used instead of pure water since the said solution had greater capacity for absorbing the sulfur oxide gas. With such a process the absorption of sulfur oxide gas would be carried out on flue gas with a large decrease in the amount of materials to be handled as well as the unexpected result that an oxidizing unit was only necessary wherein the flue gas was devoid of oxygen since the shale catalyst functioned in the presence of the usual concentrations of oxygen in flue gas.

BRIEF SUMMARY OF INVENTION

This invention relates to a process to remove polluting sulfur dioxide from a gas stream. More specifically, the invention is concerned with a method for treating a flue gas with a sulfur dioxide absorber in an aqueous medium in a scrubber so as to produce an environmentally acceptable purified gas stream.

As was hereinbefore discussed, the emission of oxides of sulfur is environmentally unacceptable and we have unexpectedly discovered that these emissions can be brought within acceptable limits by employing a catalytic absorbing system comprising pretreated shale in an aqueous medium in a scrubber to reduce the quantity of sulfur oxide pollutants vented. The use of this process will decrease the quantities of shale and water needed to absorb the sulfur dioxide gas, and can also allow the elimination of a subsequent oxidizing unit and thereby provide an economic incentive due to decreased processing costs. Due to the strict pH control, this process gives the additional benefit of producing high quality gypsum which can be sold to make gypsum board, thereby affording recapture of capital expenditures.

It is therefore an object of this invention to provide a process for improving the absorption of sulfur dioxide contaminant gas from flue gas streams.

It is a further object of this invention to provide a method that economically utilizes spent shale to catalyze the absorption of said sulfur dioxide gas.

In one aspect, an embodiment of this invention resides in a process for removal of sulfur dioxide pollutant gas from a gas stream which comprises contacting said gas stream with a catalyst comprising pretreated shale in an aqueous medium in a scrubber, and thereafter venting said desulfurized gas stream.

A specific embodiment of this invention is found in a process for the removal of sulfur dioxide from a flue gas which comprises scrubbing said flue gas with a catalyst comprising shale, which has been pretreated at an elevated temperature in the presence of a gas unable to support combustion in a basic solution of aluminum sulfate, and thereafter venting said desulfurized flue gas.

Another specific embodiment of this invention is found in a process for the removal of sulfur dioxide from a flue gas which comprises scrubbing said flue gas with a catalyst comprising shale, which has been pretreated at a range of from about 340° C. to about 480° C. in the presence of a hydrogen sulfide and subsequently extracted by means of toluene, in a buffered solution of basic aluminum sulfate, and thereafter venting said desulfurized flue gas.

Other objects and embodiments will be found in the following further detailed description of the present invention.

DETAILED DESCRIPTION OF THE INVENTION

As hereinbefore set forth, the present invention is concerned with a process for the removal of gaseous sulfur dioxide pollutants from a gas stream, such as a flue gas, with the result that the purified gas stream is vented as environmentally acceptable to the surrounding atmosphere. Since flue gas normally contains oxygen, any sulfur present in the combustion chamber will be converted to sulfur dioxide during the combustion process necessitating the employment of a system to both absorb and chemically change said sulfur dioxide to a less noxious form which can be safely disposed of. The present invention fulfills the need for absorption and chemical change of the sulfur dioxide in that the aqueous absorption process converts the sulfur dioxide to the sulfite radical with subsequent oxidation to the sulfate radical followed by precipitation as a metal sulfate.

This invention operates in conjunction with a conventional scrubber in which a gas stream is contacted with an aqueous medium. The aqueous medium can be water but then the equilibrium does not favor the formation of sulfurous acid and considerable back pressure of sulfur dioxide is built up. Whereas, if the aqueous medium has contained within it a salt, then the capacity for absorption of sulfur dioxide is greatly increased and the equilibrium favors formation of the sulfite radical in a shorter time span than for water alone. Our invention takes cognizance of this fact in the preferred embodiment by utilizing a solution of basic aluminum sulfate to absorb the sulfur dioxide and further buffer said solution to a pH of about 3.0 to about 5.6 in order to prevent the gelling of aluminum salts and to hasten the regeneration of the absorbing solution through addition of calcium carbonate to precipitate calcium sulfate.

This invention further increases the capacity of the basic aluminum sulfate solution to absorb the sulfur dioxide and decreases the necessary contact time to about 0.1 minute to about 1.0 minute by the addition of catalytic quantities of pretreated shale, thereby decreasing the required size of the scrubbing unit employed with a concomitant savings in capital costs.

The said increased capacity is the result of the catalytic oxidation, by the pretreated shale, of the dissolved sulfur dioxide to sulfuric acid, which reacts with the basic aluminum sulfate to produce aluminum sulfate. Said catalytic oxidation converts the moderately acidic sulfur dioxide-sulfurous acid system, which has a substantial vapor pressure of sulfur dioxide and reacts weakly with basic aluminum sulfate, to the strong sulfuric acid, which has no sulfur dioxide vapor pressure and readily reacts with basic aluminum sulfate, thereby accounting for the capture and retention of sulfur values out of the flue gas and into the solution.

In the preferred embodiment of this invention, the shale which is employed is known as Western Shale, but it is also contemplated within the scope of the invention that other shale may be used but not necessarily with equivalent results. The preferred pretreatment consists of heating the raw shale to a temperature in the range of about 340° C. to about 480° C. in the presence of a gas unable to support combustion, thereby retaining a portion of the shale oil but leaving behind a highly fractured, friable shale containing residual organic matter. The best results occur when this raw shale is heated from about 340° C. to about 400° C. in the presence of hydrogen sulfide and then utilized as the catalyst for the oxidation of the sulfite radical to sulfate radical in the basic aluminum sulfate absorbing solution. It has also been discovered that this pretreated shale can be processed further by contacting said shale with an organic solvent to remove substantially all organic matter, while still leaving a minor portion of the organic matter to reside in the shale, and to produce a still yet further fractured shale, easily ground to the requisite 40 to 325 US mesh, which exhibits enhanced catalytic activity as to the chemical oxidation of said sulfur dioxide pollutant gas. For purposes of this invention, the gas unable to support combustion can be taken from the group including but not limited to ammonia, nitrogen, hydrogen sulfide, carbon monoxide, and carbon dioxide and the aromatic extraction solvent may be taken from the group including but not limited to benzene, toluene and xylene.

For purposes of this invention a gas stream can be taken from the group including but not limited to flue gas, waste gas, process gas, discharge gas, and vent gas.

For purposes of this invention, basic aluminum sulfate means aluminum sulfate which has lost some sulfate radicals and has gained hydroxide radicals and is the buffering agent for the aqueous medium.

In the preferred embodiment of this invention, a gas stream such as a flue gas which contains a sulfur containing contaminant gas such as sulfur dioxide is continuously passed through a scrubber which contains a slurry of shale. The shale which is present in a slurry range of about 0.1% to about 2% by weight and preferably from about 0.1% to about 1% by weight, is pretreated at a temperature range from about 340° C. to about 480° C. and then subjected to extraction by toluene. Said shale is then slurried in a basic aluminum sulfate solution containing aluminum in the range of about 3 to 7% by weight of aluminum, buffered to about a pH of 3.3–4.0 and introduced in a spray type scrubber for a contact time of about 0.1 minute to about 1.0 minute at process temperature with the resulting absorption of 98% of the sulfur dioxide polluting gas.

In the preferred embodiment of the invention, basic aluminum sulfate is used as the buffering agent. However, it is also contemplated that other buffering agents may also be used, such as sodium acid phosphate or sodium citrate. Also, it is understood that buffering can be accomplished by addition of an alkaline reagent such as calcium carbonate, on demand of a pH sensing device.

The following examples are given for purposes of illustrating the process of this invention. However, it is to be understood that these examples are only illustrative in nature and that this invention is not necessarily limited thereto.

EXAMPLE I

A synthetic gas stream prepared by mixing 6% oxygen, 2000 ppm sulfur dioxide, and the balance comprising nitrogen, was introduced at twenty ft$^3$/hr to an aqueous medium comprising water stirred at about 1500 rpm at about 50° C. and the amount of sulfur dioxide removed by said aqueous medium was measured by a hydrogen peroxide scrubber. Under these conditions about 14% of the sulfur dioxide was removed from the gas stream after contact with the aqueous medium.

EXAMPLE II

A synthetic gas stream prepared by mixing 6% oxygen, 2000 ppm sulfur dioxide, and the balance comprising nitrogen, was introduced at twenty ft$^3$/hr to an aqueous medium comprising water stirred at about 1500 rpm at about 50° C. and the amount of sulfur dioxide removed by said aqueous medium was reasured by a hydrogen peroxide scrubber. When said aqueous medium contained calcium carbonate, the absorption of sulfur dioxide increased from that of water alone to about 64% of the available sulfur dioxide.

EXAMPLE III

A synthetic gas stream prepared by mixing 6% oxygen, 2000 ppm sulfur dioxide, and the balance comprising nitrogen, was introduced at twenty ft$^3$/hr to an aqueous medium comprising a slurry of shale, which had been pretreated at a temperature of about 370° C. in the presence of hydrogen sulfide, and stirred at about 1500 rpm at about 50° C., and the amount of sulfur dioxide removed by said aqueous medium was measured by a hydrogen peroxide scrubber. It was found that the absorption of sulfur dioxide increased to about 89%.

EXAMPLE IV

A synthetic gas stream prepared by mixing 6% oxygen, 2000 ppm sulfur dioxide, and the balance comprising nitrogen, was introduced at twenty ft$^3$/hr to an aqueous medium comprising a slurry of shale, pretreated at about 370° C. in the presence of hydrogen sulfide with subsequent subjection of said shale to extraction by toluene, and stirred at about 1500 rpm at about 50°, and the amount of sulfur dioxide removed by said aqueous medium was measured by a hydrogen peroxide scrubber. It was found that the absorption of sulfur dioxide increased to about 93%.

EXAMPLE V

A synthetic gas stream prepared by mixing 6% oxygen, 2000 ppm sulfur dioxide, and the balance comprising nitrogen, was introduced at twenty ft$^3$/hr to an aqueous medium comprising a 20% basic solution of aluminum sulfate buffered to a pH of 4.0 and stirred at about 1500 rpm at about 50°, and the amount of sulfur dioxide removed by said aqueous medium was measured by a hydrogen peroxide scrubber. The absorption of sulfur dioxide increased from that of water alone to about 94% of the available sulfur dioxide.

EXAMPLE VI

A synthetic gas stream prepared by mixing 6% oxygen, 2000 ppm sulfur dioxide, and the balance comprising nitrogen, was introduced at twenty ft$^3$/hr to an aqueous medium comprising a 20% basic solution of aluminum sulfate buffered to a pH of 4.0 and slurried with shale, pretreated at about 370° C. in the presence of hydrogen sulfide and said shale subsequently subjected to extraction by toluene, and stirred at about 1500 rpm at about 50° C., and the amount of sulfur dioxide removed by said aqueous medium was measured by a hydrogen peroxide scrubber. It was found that the absorption of sulfur dioxide increased to 98%.

The results of the above examples are graphically illustrated in Table I below.

TABLE I

| SUMMARY OF RESULTS | | | | | | |
| --- | --- | --- | --- | --- | --- | --- |
| Sample | I | II | III | IV | V | VI |
| SO$_2$ Absorption | 14% | 64% | 89% | 93% | 94% | 98% |

As can be seen from Table I above, absorption of sulfur dioxide is lowest for water (14%), increases for a solution of calcium carbonate (64%), and further increases for a basic aluminum sulfate solution (94%). In addition, it can be seen that a slurry of shale increases the absorptive ability of the water (89–93%) as well as that of the basic aluminum sulfate solution (98%). The best absorption of sulfur dioxide (98%) occurs when the aqueous medium is a 20% basic solution of aluminum sulfate and is slurried with shale that has been pretreated by heating to a temperature range from about 340° C. to about 400° C. in the presence of hydrogen sulfide and subsequently toluene extracted.

We claim as our invention:

1. A process for removal of sulfur dioxide pollutant gas from a gas stream which comprises contacting said gas stream with pretreated shale in the form of an aqueous solution of aluminum sulfate including from about 0.1 to about 2.0% by weight of said pretreated shale, the pretreatment of said shale comprising the heating of said shale in the presence of a gas unable to support combustion at a temperature in a range of from about 340° C. to about 480° C.

2. The process of claim 1 wherein said gas unable to support combustion comprises hydrogen sulfide.

3. The process of claim 1 wherein said gas unable to support combustion comprises carbon dioxide.

4. The process of claim 1 wherein said gas unable to support combustion comprises carbon monoxide.

5. The process of claim 1 wherein said gas unable to support combustion comprises nitrogen.

6. The process of claim 1 wherein said gas unable to support combustion comprises ammonia.

7. The process of claim 1 further characterized in that said shale is subjected to extraction by means of an aromatic solvent subsequent to treatment with said gas unable to support combustion.

8. The process of claim 7 wherein said aromatic solvent comprises benzene.

9. The process of claim 7 wherein said aromatic solvent comprises toluene.

10. The process of claim 7 wherein said aromatic solvent comprises xylene.

11. The process of claim 1 wherein said aqueous solution is buffered.

12. The process of claim 1 wherein the pretreated shale is ground prior to use.

13. The process of claim 12 wherein said ground shale ranges from about 40 US mesh to about 325 US mesh.

14. The process of claim 1 wherein said gas stream is in contact with said pretreated shale for a period of time ranging from about 0.1 to about 1 minute.

15. The process of claim 1 wherein said gas stream is subjected to treatment with oxygen either prior to or subsequent to said contact with said pretreated shale.

16. The process of claim 1 wherein said aqueous solution comprises a 20% basic solution of aluminum sulfate buffered to a pH of 3.3 to 4.0 and said shale is pretreated in the presence of hydrogen sulfide and subsequently subjected to extraction by toluene.

* * * * *